(12) United States Patent
Urdiales (10) Patent No.: US 7,275,777 B1
(45) Date of Patent: Oct. 2, 2007

(54) TOOL FOR LIFTING ELONGATED OBJECTS—PIVOTABLE GRAPPLE

(76) Inventor: Gilberto Urdiales, 215 Illinois, Laredo, TX (US) 78041

( * ) Notice: Subject to any disclaimer, the term of this patent is extended or adjusted under 35 U.S.C. 154(b) by 6 days.

(21) Appl. No.: 11/268,142

(22) Filed: Nov. 7, 2005

Related U.S. Application Data (60) Provisional application No. 60/626,336, filed on Nov. 9, 2004.

(51) Int. Cl.
*B65G 7/12* (2006.01)
(52) U.S. Cl. .......................................... 294/16; 294/104
(58) Field of Classification Search ................ 294/15, 294/16, 104, 137, 165, 169, 19.3, 50.9
See application file for complete search history.

(56) References Cited

U.S. PATENT DOCUMENTS

| | | | | |
|---|---|---|---|---|
| 735,799 | A | * 8/1903 | McGill | ......................... 294/16 |
| 1,651,607 | A | 12/1927 | Kutz | |
| 2,723,152 | A | 11/1955 | Doty | |
| 2,752,190 | A | 6/1956 | Baker | |
| 2,873,995 | A | * 2/1959 | Turner | ......................... 294/15 |
| 2,915,333 | A | * 12/1959 | Koenig et al. | ............... 294/104 |
| 3,347,586 | A | * 10/1967 | Sharp | ......................... 294/19.1 |
| 4,225,104 | A | * 9/1980 | Larson | ..................... 248/125.8 |
| 4,601,505 | A | 7/1986 | Chilton | |
| 4,632,442 | A | 12/1986 | Gerding | |
| 4,717,187 | A | 1/1988 | Delgado | |
| 5,024,476 | A | 6/1991 | Massey | |
| 5,791,704 | A | 8/1998 | Thompson et al. | |
| 5,979,840 | A | 11/1999 | Hollister et al. | |
| 2001/0030434 | A1 | 10/2001 | Urdiales, Jr. | |
| 2001/0050487 | A1 | 12/2001 | Urdiales, Jr. | |

OTHER PUBLICATIONS

"Iron Grip Safety Systems, Inc.—Get A Grip On Safety" sales literature by Iron Grip Safety Systems, Inc, Jan. 1, 2001.
"Crescent Pipe Tongs"—Pollard Water's website description and price list, Nov. 29, 2004.

* cited by examiner

*Primary Examiner*—Dean J Kramer
(74) *Attorney, Agent, or Firm*—George S. Gray (57) ABSTRACT

A tool is provided for minimizing operator bending while lifting an elongated circular object, such as pipe. With one hand, the operator manipulates a slidable pin while grasping the tool handle. The slidable pin allows pivotable second grapple to move outward from the tool for positioning about the object, and, once the object encounters a trigger, to return the pivotable grapple toward the tool and secure the grapple in a position across from the first grapple, the first and second grapples being shaped to closely receive the object and hold the object between the grapples. A biasing element forces the slidable pin toward the pivotable grapple, the grapple being configured to receive the pin and be held in a position opposite the first grapple.

19 Claims, 6 Drawing Sheets

Fig. 8

TOOL FOR LIFTING ELONGATED OBJECTS—PIVOTABLE GRAPPLE

CROSS-REFERENCE TO PRIOR APPLICATIONS

The applicant claims the benefit of a provisional application filed by the above-named inventor on Nov. 9, 2004 (Ser. No. 60/626,336.

BACKGROUND OF THE INVENTION

1. Field of the Invention

The field of the invention relates generally to a device for lifting and carrying elongated objects such as pipes and hoses.

2. Description of Related Art

In oil field operations, it is frequently necessary to manually lift and carry oil field pipe or frac pipe. Similarly, in firefighting operations, fire hoses must be lifted and carried by hand. Typically, such pipes and hoses must be handled under wet and slippery conditions, which are generally hazardous to the personnel involved. Additionally, such pipes and hoses are generally quite heavy and difficult to handle, even under dry conditions, which causes physical fatigue in the personnel involved.

Published U.S. Patent. Application No. US-2001-0050487, filed by Gilberto Urdiales, Jr. on Apr. 16, 2001, discloses a handle and grapple with sliding closure. The tools described therein all utilize a single grapple and a pin having a first end that protrudes to a position opposite the grapple, such that the pin itself bears upon the elongated object and forms part of the securing enclosure.

Published U.S. Patent. Application No. US-2001-0030434-A1, filed by Gilberto Urdiales, Jr. on Apr. 16, 2001, discloses a tool for lifting and carrying elongated objects which is a single member tool that is curved to first scoop, then wrap and cradle, the elongated object.

U.S. Pat. No. 5,024,476, issued to Massey on Jun. 18, 1991, discloses a tool for assisting in manually raising a heavy elongated article a small distance (e.g., a few inches) off a firm surface so that a lifting sling may be passed beneath the article. The Massey tool comprises a handle having a pair of co-acting, part-cylindrical jaw members that operate in a scissor-like manner for gripping the article to be raised, and a fulcrum projects from one of the jaw members on which the tool can be pivoted to raise the article a short distance off the surface. Although the Massey tool is capable of raising heavy elongated objects such as oil field pipe a few inches off the deck, the Massey tool is not suitable for carrying such pipe after it has been lifted off the deck.

U.S. Pat. No. 5,791,704, issued to Thompson et al. on Aug. 11, 1998, discloses a tool for manipulating irrigation pipes. The Thompson et al. tool involves a pivotally mounted arcuate jaw with a handle secured thereto, and a second arcuate jaw fixedly mounted to the handle. A spring biases the jaw members into clamping engagement with an irrigation pipe. The Thompson et al. tool is directed primarily to turning, connecting, and disconnecting irrigation pipe without the operator having to bend over and grasp the pipe by hand. However, like the Massey tool described above, the Thompson et al. tool is not suitable for carrying such pipe.

U.S. Pat. No. 4,632,442, issued to Gerding on Dec. 30, 1986, discloses a conduit carrying device having two handles on either side of a closure member that closes about the elongated object.

U.S. Pat. No. 5,979,840, issued to Hollister, et al. on Nov. 9, 1999, discloses an apparatus for gripping a fluid carrying hose having a jaw that is placed about a pressurized hose and a plunger that can be manipulated to force a pair of flanges against the hose, thus cooperating with the jaw to secure the hose. A spring on the plunger biases the plunger in a manner that retracts the pair of flanges from the hose.

U.S. Pat. No. 2,723,152, issued to Doty on Nov. 8, 1955, discloses a fishing gaff with a hook and a spring-loaded keeper rod with a point that closes the hook. The spring biases the point to a position closing the hook U.S. Pat. No. 4,601,505, issued to Chilton on Jul. 22, 1986, discloses an industrial safety pull hook, having a hook and spring-loaded slidable member with an end that closes the hook. The spring biases the slidable member end to a position closing the hook.

U.S. Pat. No. 1,651,607, issued to Kurtz on Dec. 6, 1927, discloses a material handling device having a body portion with a recess for the shaft of a hook, and a spring-loaded locking member that closes the recess about the hook shaft. The spring biases the locking member to a position closing the recess.

U.S. Pat. No. 2,752,190, issued to Baker on Jun. 26, 1956, discloses a hand rod hook having a hook for receiving a pipe and a spring-loaded latch bar that closes the hook about the pipe. The spring biases the latch bar to a position closing the hook.

U.S. Pat. No. 4,717,187, issued to Delgado on Jan. 5, 1988, discloses an apparatus for imparting rotational movement to a work object, having a capture assembly having a cradle for receiving a portion of the object. The capture assembly rotates with respect to a force transmitting member having a handle. Such rotation forces a pressure plate against another portion of the object, thus grasping the entire object for rotation of the object in one direction.

While the foregoing devices are functional for the purposes stated for each, it remains that such devices do not provide the optimum tool for a user desiring to quickly and efficiently lift and carry elongated objects. For example, such tools do not provide effective means for attaching the tool to the object, automatically locking the tool in a closed position about the object, lifting the object, and releasing the tool from the object, using only a single hand. Thus, a need exists for a tool that would allow the user to easily grasp, lift, and carry pipes, hoses, and other elongated objects, particularly under wet and slippery conditions, using a single hand, with the tool locking about the object automatically. Such a handheld tool would increase safety and decrease physical fatigue of pipe handling personnel, and also decrease injuries to fingers that occur when bare hands are utilized. Such a tool should be simple to use, inexpensive to manufacture, and easy to maintain.

SUMMARY OF THE INVENTION

The present invention overcomes the shortcomings of the prior art by providing a tool optimized a user desiring to quickly and efficiently lift and carry elongated objects. My invention provides effective means for attaching the tool to the object, automatically locking the tool in a closed position about the object, lifting the object, and releasing the tool from the object, using only a single hand. My invention provides a tool that allows the user to easily grasp, lift, and carry pipes, hoses, and other elongated objects, particularly under wet and slippery conditions, using a single hand, with the tool locking about the object automatically. My invention increases safety and decreases physical fatigue of pipe handling personnel, by avoiding the back and shoulder injuries typically associated with having to pick up pipe by hand and with carrying pipe on the shoulder. My tool and is simple to use, inexpensive to manufacture, and easy to maintain.

In one exemplary embodiment of my invention, I have provided a tool for grasping and lifting an elongated object, the tool comprising: a graspable lift member having a body and a first grapple extending from the body, the grapple having a curved portion; a pivoting second grapple, having a closed position and an open position, the second grapple having a trigger member and a curved portion, the second grapple positioned in opposition to the first grapple such that, when the second grapple is in the open position, the elongated object is insertable between the first and second grapple, and further such that the first and second grapple close about the elongated object when the second grapple is moved to the closed position, the second grapple trigger member being positioned such that, as the elongated object is inserted, the elongated object encounters the trigger member, and forces the second grapple from the open to the closed position; a slidable pin member positioned on the lift member, the pin member having a first end and a graspable second end, the pin member being movable from a first position to a second position; and a biasing element, the biasing element biasing the pin member toward the pin member first position; wherein the biasing element bias causes the pin member first end to enter a first position between the closed second grapple and the body, preventing the closed second grapple from moving to the open position until the pin member is moved to the second position, wherein the second grapple is movable to the open position; and further wherein the biasing element causes the pin member first end to bear upon the second grapple when the second grapple is in the open position, the pin member holding the second grapple in the open position until the elongated object encounters the trigger element and forces the second grapple to the closed position by overcoming the biasing element bias.

In some exemplary embodiments of my invention, the biasing element comprises a spring.

In some exemplary embodiments of my invention, the lift member and the pin member second end are simultaneously graspable by a single hand, and in some such exemplary embodiments, the pin second end is movable toward the pin member second position while the lift member and the pin member are being simultaneously grasped by a single hand.

In some exemplary embodiments of my invention, the elongated object to be lifted is generally tubular and has an outer diameter, and the first grapple curved portion is shaped to substantially correspond with the elongated object outer diameter.

In some exemplary embodiments of my invention, the elongated object to be lifted is generally tubular and has an outer diameter, and the second grapple curved portion is shaped to substantially correspond with the elongated object outer diameter.

In some exemplary embodiments of my invention, the elongated object to be lifted is generally tubular and has an outer diameter, and the first grapple curved portion is generally circular and has a diameter at least as large as the elongated object outer diameter.

In some exemplary embodiments of my invention, the elongated object to be lifted is generally tubular and has an outer diameter, and the second grapple curved portion is generally circular and has a diameter at least as large as the elongated object outer diameter.

In some exemplary embodiments of my invention, the lift member has a handle by which the lift member is grasped, the pin member second end being positioned proximate the handle.

In one exemplary embodiment of my invention I have provided, a tool for grasping and lifting an elongated object, the tool comprising: a graspable lift member having a body and a first grapple extending from the body, the grapple having a curved portion; a pivoting second grapple, having a closed position and an open position, the second grapple having trigger means and a curved portion, the second grapple positioned in opposition to the first grapple such that, when the second grapple is in the open position, the elongated object is insertable between the first and second grapple, and further such that the first and second grapple close about the elongated object when the second grapple is moved to the closed position, the second grapple trigger means being positioned such that, as the elongated object is inserted, the elongated object encounters the trigger means, and forces the second grapple from the open to the closed position; a slidable pin member positioned on the lift member, the pin member having a first end and a second end, the pin member further comprising means for moving the pin member from a first position to a second position; and biasing means, for biasing the pin member toward the pin member first position; wherein the biasing means causes the pin member first end to enter a first position between the closed second grapple and the body, preventing the closed second grapple from moving to the open position until the pin member is moved to the second position, wherein the second grapple is movable to the open position; and further wherein the biasing means causes the pin member first end to bear upon the second grapple when the second grapple is in the open position, the pin member holding the second grapple in the open position until the elongated object encounters the trigger means and forces the second grapple to the closed position by overcoming the biasing means bias.

In some exemplary embodiments of my inventions, the lift member and the pin member second end are simultaneously graspable by a single hand.

In some exemplary embodiments of my inventions, the pin second end is movable toward the pin member second position while the lift member and the pin member are being simultaneously grasped by a single hand.

In some exemplary embodiments of my inventions, the elongated object is generally tubular and has an outer diameter.

In some exemplary embodiments of my inventions, the first grapple curved portion is shaped to substantially correspond with the elongated object outer diameter.

In some exemplary embodiments of my inventions, the second grapple curved portion is shaped to substantially correspond with the elongated object outer diameter.

In some exemplary embodiments of my inventions, the first grapple curved portion is generally circular and has a diameter at least as large as the elongated object outer diameter.

In some exemplary embodiments of my inventions, the second grapple curved portion is generally circular and has a diameter at least as large as the elongated object outer diameter.

In some exemplary embodiments of my inventions, the lift member further comprises means for holding the lift member, the pin member second end being positioned proximate the handle.

The foregoing features and advantages of my invention will be apparent from the following more particular descriptions of exemplary embodiments of the invention as illustrated, in some embodiments, in the accompanying drawings.

DETAILED DESCRIPTION OF EXEMPLARY EMBODIMENTS

The following discussion describes exemplary embodiments of the invention in detail. This discussion should not be construed, however, as limiting the invention to those particular embodiments. Practitioners skilled in the art will recognize numerous other embodiments as well.

Figure 1:
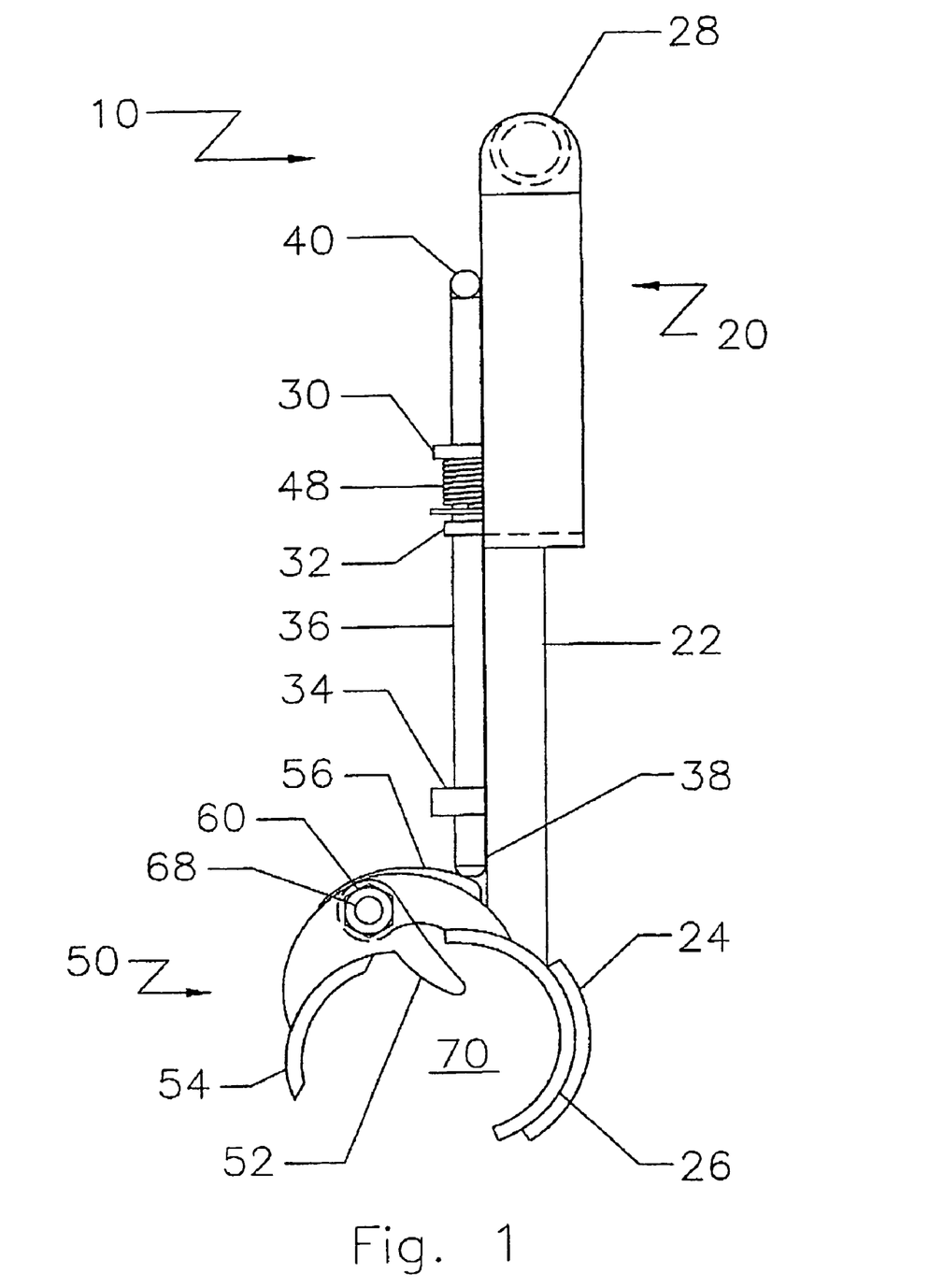
FIG. 1 is a side view of an exemplary embodiment of the present invention, wherein the pivotable second grapple is in the open position.
Figure 2:
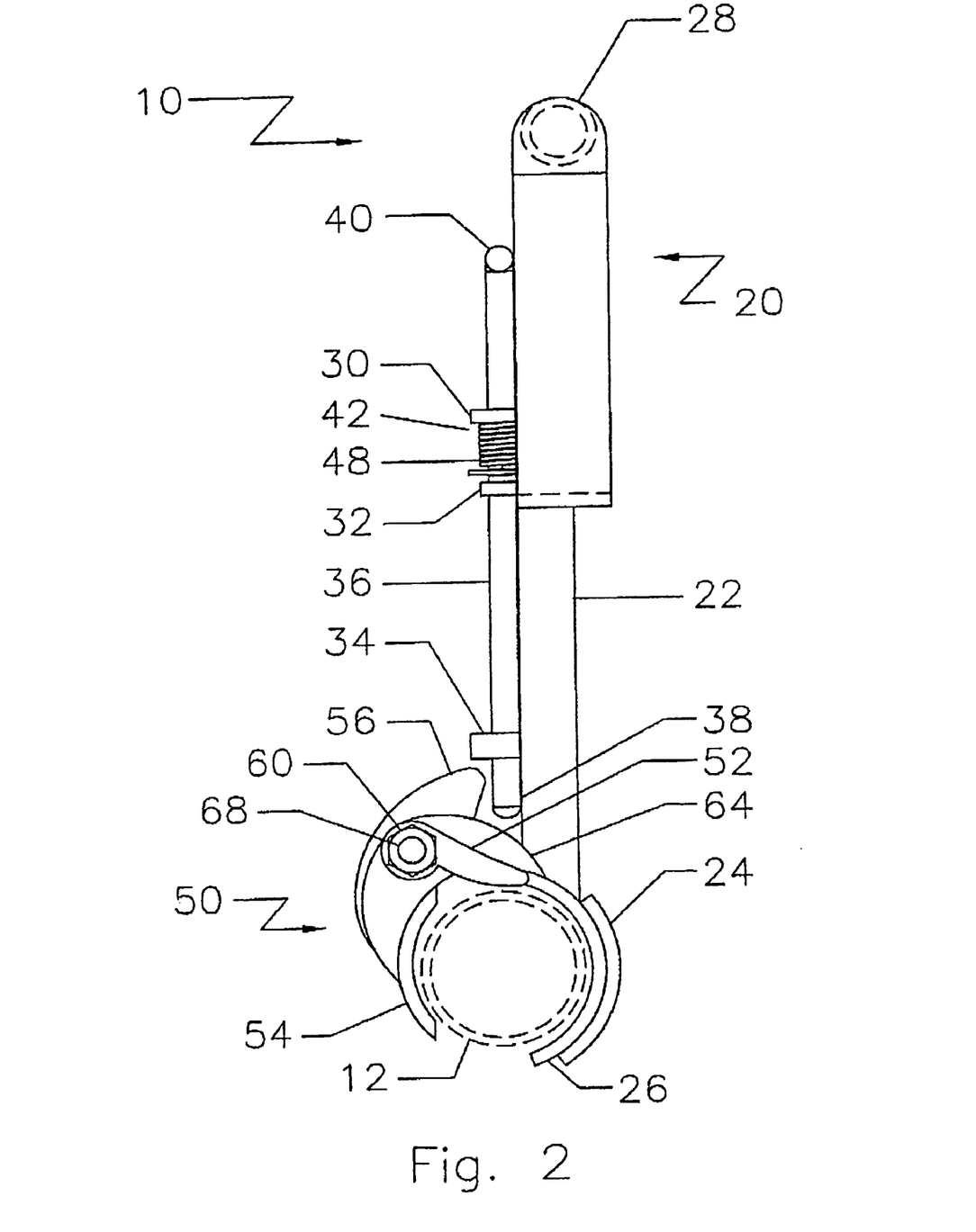
FIG. 2 is a side view of an exemplary embodiment of the present invention, wherein the pivotable second grapple is in the closed position.
Figure 3:
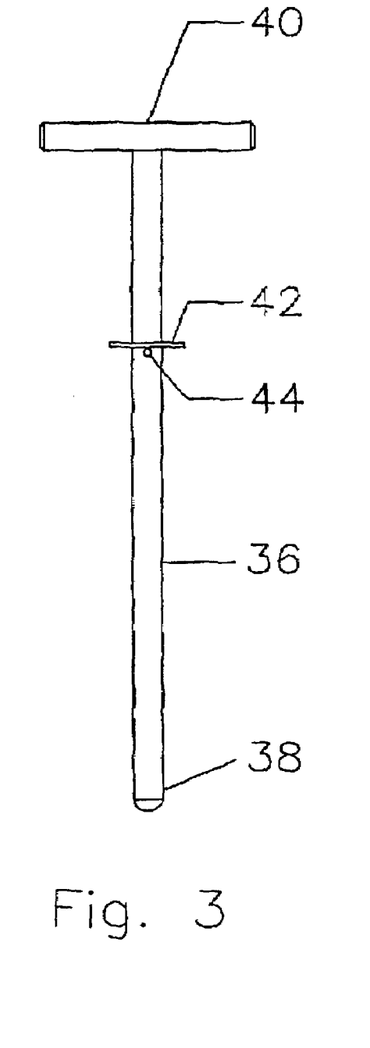
FIG. 3 is a front view of the pin member, also depicting the washer and retaining pin hole.
Figure 4:
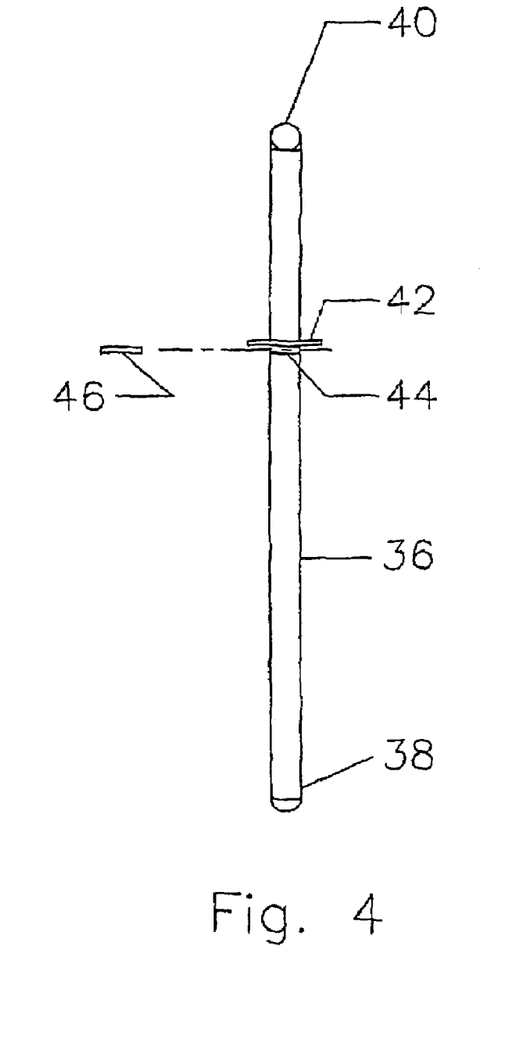
FIG. 4 is a front view of the pin member, also depicting the washer, retaining pin hole, and the retaining pin (removed from the hole for clarity).
Figure 5:
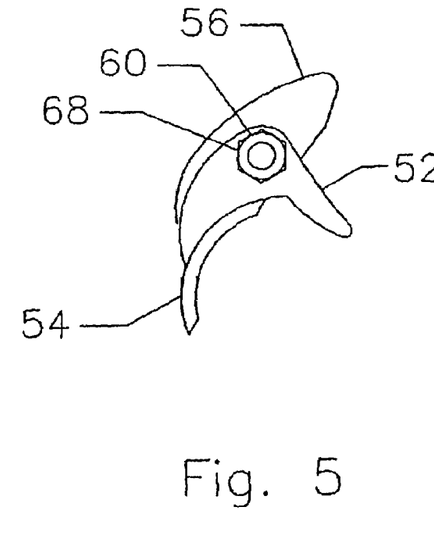
FIG. 5 is a side view of the pivotable second grapple, with attaching bolt and nut shown.

Referring now to FIGS. 1-6, wherein an exemplary embodiment of the present device 10 is depicted, and is shown to include a lift member 20, the lift member having a body 22 and a fixed first grapple 24 extending from the body, the grapple having a curved portion 26 with a curved interior. In this exemplary embodiment, the lift member forms a tubular handle 28, as depicted in FIGS. 1-2.

In some exemplary embodiments of the kind shown in FIGS. 1-2 and FIGS. 7-8, a first guide 30, second guide 32 and third guide 34 are positioned on the lift member, each having holes aligned for positioning a pin 36 on the body. The pin, as shown for this exemplary embodiment in FIGS. 3-4, has a first end 38, a graspable second end 40, a washer 42, and a hole 44 for receiving a retaining pin 46. In some exemplary embodiments, the pin is rectangular in cross-section. As shown for this exemplary embodiment in FIGS. 1-2, the pin washer 42 is positioned on the installed pin 36, between the first and second guides 30,32, with a spring 48 being positioned between the washer and the first guide. In this position the spring biases the pin 36 to a first position, that is, toward the first grapple 24. The retaining pin 46 positions the washer 42 in the optimum position on the pin. In this exemplary embodiment, the handle 28 and the pin second end 40 are simultaneously graspable by a single hand, such that the pin is moved to a second position, in a direction away from the first grapple 24, as the hand clenches the handle 28 and the pin second end 40.

As shown further for this exemplary embodiment, in FIGS. 1-2 and FIGS. 5-6, a pivoting second grapple 50 is included, the second grapple, having a trigger member 52, reinforcement structure 53, a curved portion 54 with a curved interior, a pin displacement member 56, and a hole 58, for receiving a bolt 60. The bolt attaches the second grapple to the body 22 at a body first grapple extension 64 extending from the body, the extension 64 having a hole (not shown) for aligning with hole 58 to receive the bolt 60, the bolt being secured with nut 68.

Figure 6:
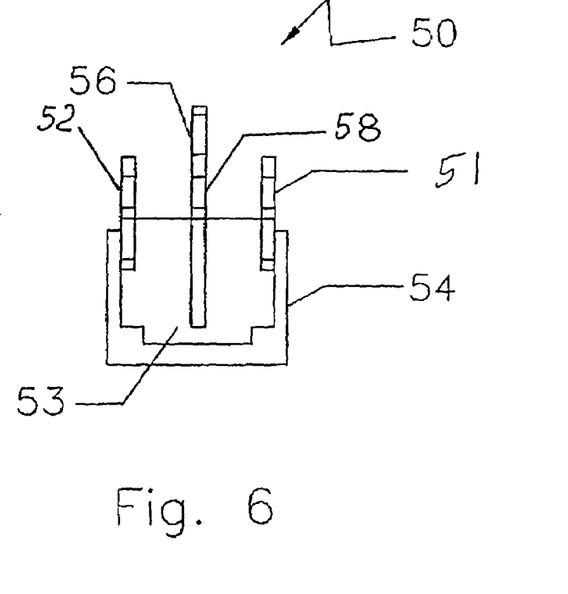
FIG. 6 is a front view of the pivotable second grapple, with the attaching bolt hole shown.
Figure 7:
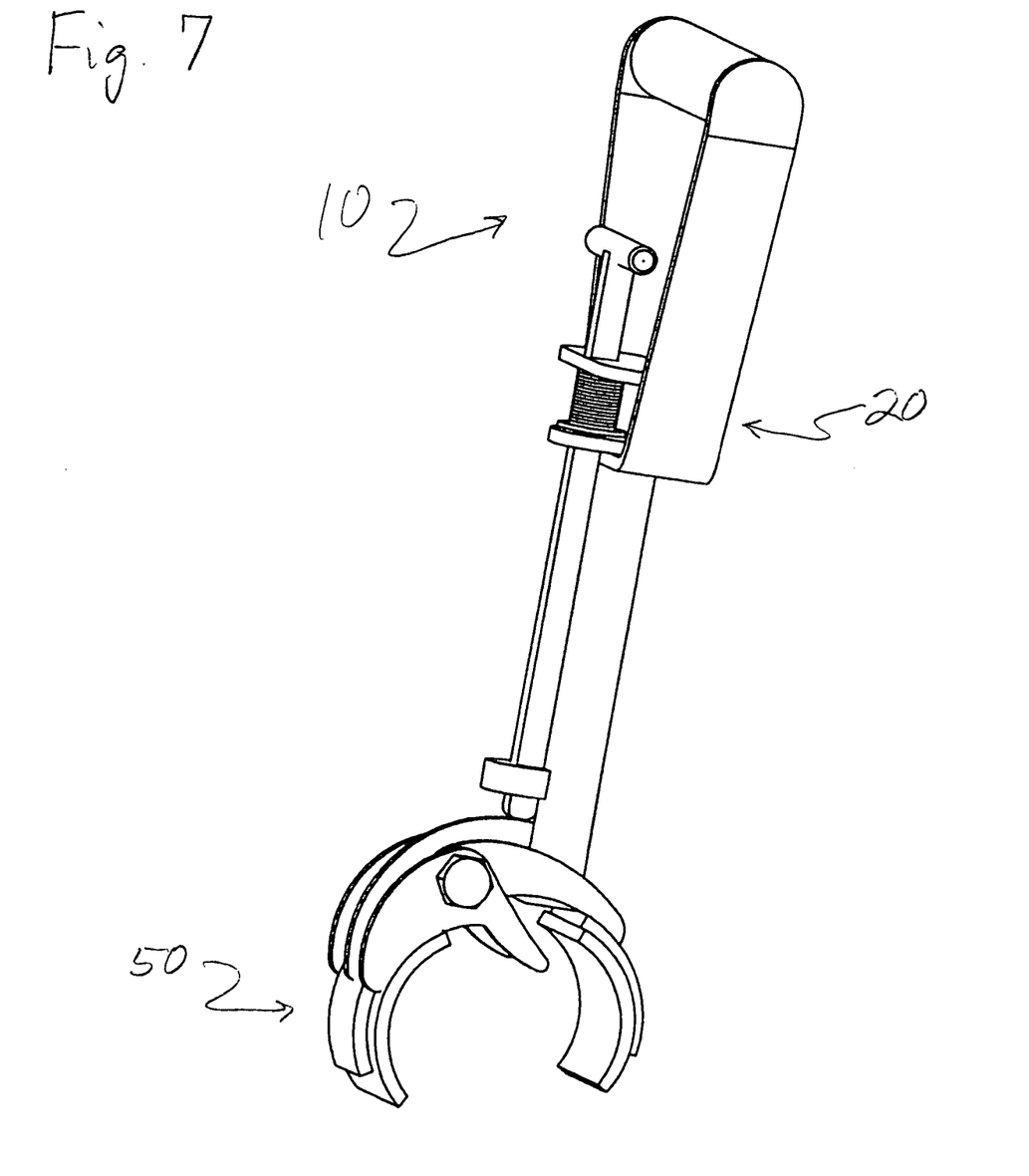
FIG. 7 is a perspective view of an exemplary embodiment of the present invention with the grapple pivoted open.
Figure 8:
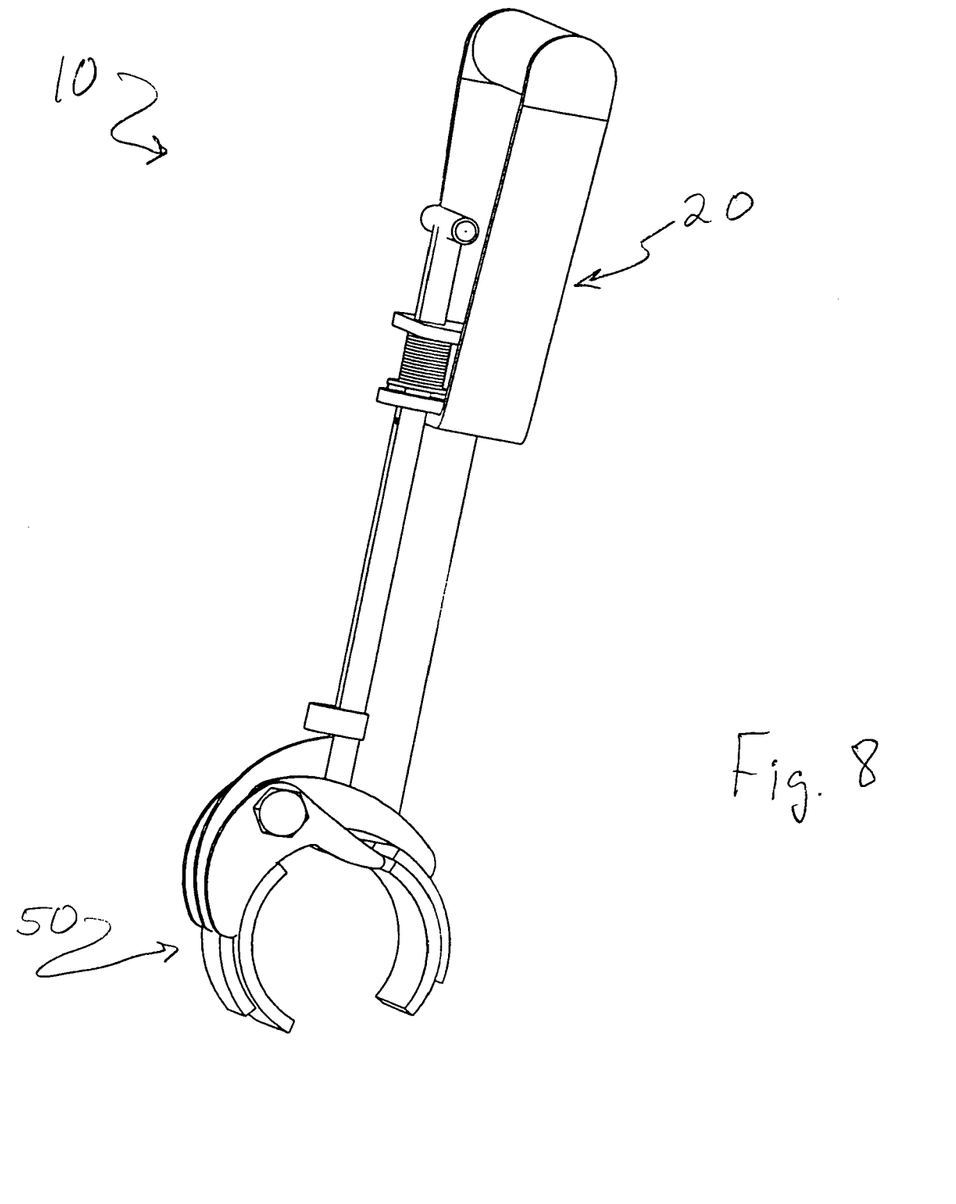
FIG. 8 is a perspective view of an exemplary embodiment of the present invention with the grapple in the non-pivoted position.

In some exemplary embodiments, the trigger 52 is positioned on only one side of the pivoting second grapple 50, such as the front position shown in FIG. 1. In other exemplary embodiments, the trigger 52 is present in both the front position and in a symmetrically corresponding rear position as shown in FIG. 6, wherein trigger 51 is on the opposite side of the second grapple 50.

In some exemplary embodiments of the present invention, and where the elongated object to be lifted is tubular with an outer diameter, the first grapple curved portion is shaped to substantially correspond with the elongated object outer diameter. In some exemplary embodiments, the first grapple curved portion is generally circular and has a diameter at least as large as the elongated object outer diameter. Similarly, in some exemplary embodiments, the second grapple curved portion is shaped to substantially correspond with the elongated object outer diameter, while in some exemplary embodiments, the second grapple curved portion is generally circular and has a diameter at least as large as the elongated object outer diameter.

In the exemplary embodiment depicted in FIGS. 1-2, the second grapple 50 pivots on the bolt 60 between an open position and a closed position, the second grapple being positioned in opposition to the first grapple 24 such that, when the second grapple is in the open position, the elongated object is insertable between the first and second grapple. In the open position, the second grapple pin displacement member 56 is beneath the pin first end 38 and the bias of the spring 48 holds the second grapple in the open position, as shown in FIG. 1. The second grapple trigger 52 protrudes into the interior space 70 between the first grapple 24 and the second grapple 50 such that, when the pipe 12 is inserted into such space, the pipe encounters the trigger and forces the second grapple to pivot about the bolt 60. The second grapple pin displacement member 56 is curved such that the pin first end 38 follows the pin displacement member 56 as the second grapple is moved to the closed position, in which the first and second grapple are closed about the pipe.

In this exemplary embodiment, when the second grapple 50 has been forced by the inserted pipe 12 to the closed position (as shown in FIG. 2), the second grapple pin displacement member 56 is no longer beneath the pin first end 38. The spring 48 biased the pin first end to move to a first position between the pin displacement member and the body 22, thus locking the second grapple in the closed position until the pin first end is moved to a second position by pulling on the graspable pin second end 40 and overcoming the spring bias.

In operation, the user simultaneously grasps the lift member handle 28 and the pin second end 40, and by clenching the two, moves the pin end 38 to its second position, allowing the second grapple 50 to move to the open position, with the trigger 52 protruding into the interior space 70 between the first grapple 24 and the second grapple. When the user releases the pin second end 40, the spring 48 bias forces the pin first end 38 against the second grapple pin displacement member, thus preventing the second grapple 50 from falling back to the closed position. The user then urges the tool 10 about the pipe 12 to be lifted, such that the pipe enters between the first and second grapples, thus encountering the trigger and moving the second grapple to the closed position about the pipe, as shown in FIG. 2. While the second grapple is being so moved, the second grapple pin displacement member 56 overcomes the spring 48 bias and moves the pin first end as necessary to allow the second grapple to move to the closed position. Once the second grapple is in the closed position, the spring bias forces the pin first end between the second grapple pin displacement member 56 and the lift member body 22, thus locking the second grapple into the closed position. The user has then secured the pipe between the first grapple 24 and the second grapple 50, and can lift the pipe 12 by pulling up on the lift member handle 28.

When the secured pipe has been carried to the desired location, the user lowers the pipe to the ground and once again grasps the lift member handle 28 and the pin second end 40 simultaneously with one, and by clenching the hand, moves the pin first end 38, against the spring 48 bias, from between the second grapple pin displacement member 56 and the lift member body 22 to the pin first end second position. The user may then pull up on the lift member handle 28 and the second grapple 50 pivots about the bolt 60 allowing the second grapple and first grapple 24 to separate such that the pipe is released as the tool 10 is elevated. By hand manipulation, or inverting the tool, the second grapple is positionable in the open position, allowing the user to release the pin second end 40, such that the spring bias forces the pin first end 38 against the second grapple pin displacement member 56, thus holding the second grapple in the open position, and ready for starting the process over with another pipe.

In practice, the user will encounter elongated objects of various diameters and cross-sections. In other exemplary embodiments of my invention either or both of the first grapple curved portion 26 and the second grapple curved portion 54 are resized to accommodate anticipated diameters and cross-sections. In some exemplary embodiments, the grapple 50 is interchangeable with another grapple having a curved portion with a larger or smaller diameter, thus providing a closer fit for securing the elongated object.

In particular, the first grapple curved portion 26 and the second grapple curved portion 54 are readily sizable to correspond with pipe diameters from 1 inch to 10 inches, including typical oil and gas industry pipe outer diameters, e.g. 2-3/8, 2-5/8, 3-1/2, 4, 5-1/2, and 6 inches.

With respect to the above description then, it is to be realized that the tool may be constructed from various metals and/or plastics depending upon the particular application, which will occur to those skilled in the art upon review of the present disclosure. For example, cast iron, aluminum, brass, or stainless steel, are suitable materials for the construction of the tool, in some cases, depending on the elongated object to be lifted.

All equivalent relationships to those illustrated in the drawings and described in the specification are intended to be encompassed by the present invention.

The descriptions in this specification are for purposes of illustration only and are not to be construed in a limiting sense.

The invention claimed is:

1. A tool for grasping and lifting an elongated object, the tool comprising:
   a graspable lift member having a body and a first grapple extending from the body, the grapple having a curved portion;
   a pivoting second grapple, having a closed position and an open position, the second grapple having a trigger member and a curved portion, the second grapple positioned in opposition to the first grapple such that, when the second grapple is in the open position, the elongated object is insertable between the first and second grapple, and further such that the first and second grapple close about the elongated object when the second grapple is moved to the closed position, the second grapple trigger member being positioned such that, as the elongated object is inserted, the elongated object encounters the trigger member, and forces the second grapple from the open to the closed position;
   a slidable pin member positioned on the lift member, the pin member having a first end and a graspable second end, the pin member being movable from a first position to a second position; and
   a biasing element, the biasing element biasing the pin member toward the pin member first position;
   wherein the biasing element bias causes the pin member first end to enter a first position between the closed second grapple and the body, preventing the closed second grapple from moving to the open position until the pin member is moved to the second position, wherein the second grapple is movable to the open position;
   and further wherein the biasing element causes the pin member first end to bear upon the second grapple when the second grapple is in the open position, the pin member holding the second grapple in the open position until the elongated object encounters the trigger member and forces the second grapple to the closed position by overcoming the biasing element bias.

2. The tool of claim 1, wherein the biasing element comprises a spring.

3. The tool of claim 1, wherein the lift member and the pin member second end are simultaneously graspable by a single hand.

4. The tool of claim 3, wherein the pin second end is movable toward the pin member second position while the lift member and the pin member are being simultaneously grasped by a single hand.

5. The tool of claim 1, wherein the elongated object is generally tubular and has an outer diameter.

6. The tool of claim 5, wherein the first grapple curved portion is shaped to substantially correspond with the elongated object outer diameter.

7. The tool of claim 5, wherein the second grapple curved portion is shaped to substantially correspond with the elongated object outer diameter.

8. The tool of claim 5, wherein the first grapple curved portion is generally circular and has a diameter at least as large as the elongated object outer diameter.

9. The tool of claim 5, wherein the second grapple curved portion is generally circular and has a diameter at least as large as the elongated object outer diameter.

10. The tool of claim 1, wherein the lift member has a handle by which the lift member is grasped, the pin member second end being positioned proximate the handle.

11. A tool for grasping and lifting an elongated object, the tool comprising:
    a graspable lift member having a body and a first grapple extending from the body, the grapple having a curved portion;
    a pivoting second grapple, having a closed position and an open position, the second grapple having trigger means and a curved portion, the second grapple positioned in opposition to the first grapple such that, when the second grapple is in the open position, the elongated object is insertable between the first and second grapple, and further such that the first and second grapple close about the elongated object when the second grapple is moved to the closed position, the second grapple trigger means being positioned such that, as the elongated object is inserted, the elongated object encounters the trigger means, and forces the second grapple from the open to the closed position;

a slidable pin member positioned on the lift member, the pin member having a first end and a second end, the pin member further comprising means for moving the pin member from a first position to a second position; and biasing means, for biasing the pin member toward the pin member first position;

wherein the biasing means causes the pin member first end to enter a first position between the closed second grapple and the body, preventing the closed second grapple from moving to the open position until the pin member is moved to the second position, wherein the second grapple is movable to the open position;

and further wherein the biasing means causes the pin member first end to bear upon the second grapple when the second grapple is in the open position, the pin member holding the second grapple in the open position until the elongated object encounters the trigger means and forces the second grapple to the closed position by overcoming the biasing means bias.

12. The tool of claim 11, wherein the lift member and the pin member second end are simultaneously graspable by a single hand.

13. The tool of claim 12, wherein the pin second end is movable toward the pin member second position while the lift member and the pin member are being simultaneously grasped by a single hand.

14. The tool of claim 11, wherein the elongated object is generally tubular and has an outer diameter.

15. The tool of claim 14, wherein the first grapple curved portion is shaped to substantially correspond with the elongated object outer diameter.

16. The tool of claim 14, wherein the second grapple curved portion is shaped to substantially correspond with the elongated object outer diameter.

17. The tool of claim 14, wherein the first grapple curved portion is generally circular and has a diameter at least as large as the elongated object outer diameter.

18. The tool of claim 14, wherein the second grapple curved portion is generally circular and has a diameter at least as large as the elongated object outer diameter.

19. The tool of claim 14, wherein the lift member further comprises means for holding the lift member, the pin member second end being positioned proximate the means for holding the lift member.

* * * * *